(12) United States Patent
Martin et al.

(10) Patent No.: US 6,188,429 B1
(45) Date of Patent: *Feb. 13, 2001

(54) VIDEO TTY DEVICE AND METHOD FOR VIDEOCOMMUNICATION

(75) Inventors: Bryan R. Martin, Campbell; Truman Joe, San Jose; Richard Medugno, Fremont, all of CA (US)

(73) Assignee: Netergy Networks, Inc, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/053,968

(22) Filed: Apr. 2, 1998

Related U.S. Application Data

(63) Continuation-in-part of application No. 08/934,184, filed on Sep. 19, 1997, now Pat. No. 5,978,014.

(51) Int. Cl.[7] .......................................... H04N 7/14
(52) U.S. Cl. ................... 348/15; 348/14; 379/52
(58) Field of Search ................... 348/14, 15, 16, 348/17; 379/52, 90.01, 93.05, 93.17, 93.21, 93.23; 455/558, 557

(56) References Cited

U.S. PATENT DOCUMENTS

| | | |
|---|---|---|
| 5,379,351 | 1/1995 | Fandrianto et al. . |
| 5,592,538 * | 1/1997 | Kosowsky et al. ............... 379/93.17 |
| 5,594,813 | 1/1997 | Fandrianto et al. . |
| 5,791,992 * | 8/1998 | Crump et al. ............................. 463/41 |
| 5,793,416 * | 8/1998 | Rostoker et al. ....................... 348/14 |
| 5,835,577 * | 11/1998 | Disanto et al. .................... 379/93.19 |

FOREIGN PATENT DOCUMENTS

| | | | |
|---|---|---|---|
| 402130087A * | 5/1990 | (JP) | ................................. H04N/7/14 |
| 404120890A * | 5/1992 | (JP) | ................................. H04N/7/14 |
| 406311509A * | 11/1994 | (JP) | ................................. H04N/7/14 |

OTHER PUBLICATIONS

International Telecommunication Union ITU–T Draft H. 324 Terminal for Low Bitrate Multimedia Communication, 1995.
International Telecommunication Union ITU–T Recommendation G.723.1 Dual Rate Speech Coder for Multimedia Communications Transmitting at 5.3 and 6.3 kbit/s, 1996.
International Telecommunication Union ITU–T Recommendation G.711 Pulse Code Modulation (PCM) of Voice Frequencies, 1988, 1993.
International Telecommunication Union ITU–T Recommendation G.728 Coding of Speech at 16 kbit/s Using Low–Delay Code Excited Linear Prediction, 1992.

* cited by examiner

Primary Examiner—Curtis A. Kuntz
Assistant Examiner—Melur Ramakrishnaiah

(57) ABSTRACT

A video communications device used as part of a communication terminal in a video-conferencing arrangement provides the capability of real-time captioning along with real-time visual communication for the individuals that are hearing- or language-impaired and others whose speech is not understandable or non-existent. The device enhances the ability of people with communication disabilities to communicate quickly and effectively with those who are similarly afflicted as well as with those who are not. In one example embodiment, the video communications device includes a camera and a teletype device (TTY) for transmitting and receiving teletype information. The camera captures local images and generates a set of video signals representing those images. A teletype device captures input data from a user and generates a set of data signals. The device can be configured for compatibility with conventional equipment and for alerting users of incoming calls nonaudibly.

34 Claims, 3 Drawing Sheets

VIDEO TTY DEVICE AND METHOD FOR VIDEOCOMMUNICATION

RELATED APPLICATION

This is a continuation-in-part application of U.S. patent application Ser. No. 08/934,184, bearing the same title, filed on Sep. 19, 1997 now U.S. Pat. No. 5,978,014, and incorporated herein by reference.

FIELD OF THE INVENTION

The present invention relates generally to communication systems. More particularly, the present invention relates to video communication systems having teletype technology for individuals using a visual mode of communication.

BACKGROUND OF THE INVENTION

Traditionally, the only real-time means of communication for the hearing impaired and others who do not speak or understand speech was via electronic mail, facsimile, or teletype machines. Recently however, a significant effort has been made to use video-communication equipment to provide real-time visual communication that will support signed language over an analog telephone line. Such equipment generally includes two or more communication terminals participating in the transmission and/or reception of data representing captured video images, typically along with signals representing speech. One type of conventional video-conferencing arrangement includes at least one communication terminal set up with a camera, an image processor, and a transmission device transmitting captured video images for display at the other terminal(s).

While the benefits of video-conferencing equipment are widely recognized, extensive use of video-conferencing equipment for signed language has been inhibited largely due to unavailability of a common network interface, high costs, inconvenience and poor video quality. Improving video quality and increased convenience have proven to be costly considerations. For this reason, there have been pressures to develop certain more expensive systems with increased video quality and convenience and certain other systems that forego the convenience and quality criteria for the sake of reducing costs.

The benefits of video-conferencing equipment should be enjoyed by all. Existing systems provide video and audio capabilities with the emphasis on audio quality. The needs of those with verbal communication difficulties are significantly different. Until now, video-conferencing systems have not been designed in a way that readily accommodates individuals with these disabilities.

SUMMARY OF THE INVENTION

According to one embodiment, the present invention is directed to methods and arrangements for use in video- and teletype-conferencing. Certain aspects of the present invention are directed to a video communications device and method for use in connection with video-conferencing between communication terminals over a communications channel. Local images are captured and a set of video signals representing the images are generated. A teletype device captures user-input data and generates a set of data signals representing the user-generated data. The set of data signals, the video data and audio data signals are multiplexed and sent over the communications channel and a processor-based circuit executes a program to cause the processor-based circuit to provide various types of display functions.

According to one embodiment of the present invention, a teletype communicator for communicating with a remote communication terminal over a communications channel, comprises: a keyed input device including user-engageable keys arranged to generate data over a wireless channel in response to a user engaging the keyed input device; and a teletype arrangement including a receiver constructed to receive the data over the wireless channel, an interface circuit for communicating over the communications channel, and a processor-based circuit having a program that, when executed, causes the processor-based circuit to communicate teletype information over the communications channel and to generate data for user display.

The teletype arrangement can further include a camera arranged to capture local images and, in response, generate a set of video signals representing the captured images. The processor-based circuit can also be configured and arranged to communicate video information over the communications channel and to generate within the teletype information both text data and video data for user display.

In a more particular embodiment, the teletype arrangement further includes a display having top support area and wherein the camera is configured in a housing that is arranged to capture local images while supported on the support area and wherein the processor-based circuit is further configured and arranged to cause the text data to be displayed above the video data, thereby directing a user that is reading the text data toward the camera.

Another aspect of the present invention involves connecting a conventional TTY type device directly into a videphone. In this video-teletype communication arrangement, a TTY device, including user-engageable keys, generates teletype data in response to a user engaging the keys; and a processor-based circuit has a program that, when executed, causes the processor-based circuit to communicate the video image data and the teletype data over a communications channel.

The above summary of the invention is not intended to describe each disclosed embodiment of the present invention. An overview of other example aspects and implementations will be recognizable from the figures and of the detailed description that follows.

BRIEF DESCRIPTION OF THE DRAWINGS

Other aspects and advantages of the present invention will become apparent upon reading the following detailed description and upon reference to the drawings in which.

Figure 1:
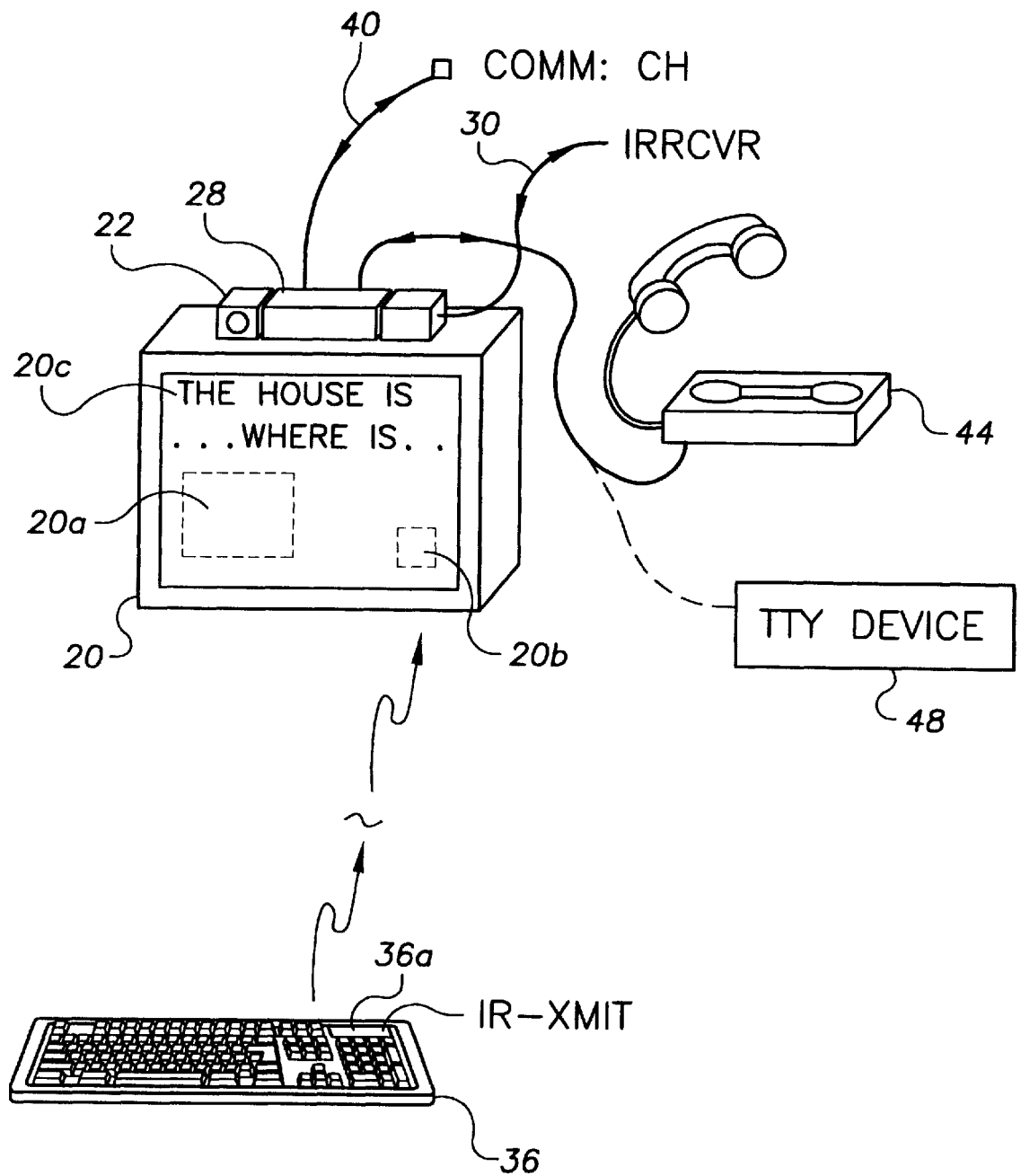
FIG. 1 is a perspective view of an example video-teletyping arrangement, according to a particular application of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention has a variety of applications and has been found to be particularly advantageous in video-conferencing applications requiring or benefiting from real-time visual communication in which at least one party is hearing or language impaired. The ability to use facial expressions, movements, and limited signing reduces the amount of information that a user has to type via manual teletype entry and adds to the enjoyment of the conversation. An appreciation of various aspects of the invention is best gained through a discussion of various application examples operating in such an environment.

Turning now to the drawings, FIG. 1 provides a perspective view of an example arrangement of devices that may be used to implement a video-teletyping conference. The arrangement is advantageous in that it can provide significant communication for numerous applications, including conferencing for the hearing or language impaired, at relatively low cost. The arrangement includes a conventional television 20, a video camera 22 adjustably mounted adjacent the top surface of the television 20, a video-control unit 28, an infrared receiver 30, and a keyboard 36. The video-control unit 28, the camera 22 and the IR receiver 30 can be modularly arranged and interconnected using, for example, a VC50- or VC55-type video-control unit (available from 8×8, Inc. of Santa Clara, Calif.) with the IR receiver plugged into the VC50 or VC55 pod auxiliary expansion port. Alternatively, the video-control unit 28, the camera 22 and the IR receiver 30 can be housed and interconnected as one or two units using, for example, the same type of equipment as with the above modular arrangement integrated into a larger housing than is used in connection with the VC50- and VC55-type video-control units.

In one embodiment, the keyboard 36 is a wireless unit having an infrared (IR) transmitter 36a that transmits codes representing the user-keyed data for processing by the video-control unit 28 and transmission to another terminal over a communications channel 40. One such commercially available wireless keyboard unit is the KB12, sold by 8×8, Inc. of Santa Clara, Calif. In other embodiments, the keyboard 36 is wired to the video-control unit 28 and/or used to control the video-control unit 28 in connection with initiation and operation of the video-teletype conferencing. The keyboard 36 can be implemented as one of many different types of key sets, such as keypad devices, PC keying arrangements and, for certain applications, stenography machines (such as those available from Stentura LX) and similarly equipped key-entry devices.

A conventional telephone set 44 and a conventional TTY device 48 illustrate additional control features of the arrangement of FIG. 1. As alternatives to the keyboard 36, either the conventional telephone set 44 or the TTY device 48 can be used to control the video-control unit 28 in connection with initiation (including answering incoming and commencing outgoing calls) and operation of the video-teletype conferencing. Such call initiation can occur whether or not the unit is connected to the phone port of the video-control unit 28. General operation of the video-control unit 38 can be provided by the phone set 44, the TTY device 48 or the keyboard 36 using assigned "menu" codes and other codes for overall operation of the conferencing session.

As an example operation, after establishing a normal "voice" or "TTY" call, a decision is made to begin a video teletype call (referring to a videoconferencing call involving transmission and simultaneous display of both text and video images). A video link over the communications channel 40 is established by entering the DTMF (dual-tone multiple frequency) equivalent of #1 on the telephone set 44 or on the TTY device 48 (with one of these devices connected to the phone port of the video-control unit 28), or by selecting a "start video" key sequence on the wireless keyboard 36. Once a videocall is established, keystrokes typed on the keyboard 36 appear in a virtual text buffer at the top of the screen (of the respective displays) of both the local and remote terminals. Using compatible and similarly-programmed video-control units 28, typing from either side of the communications channel 40 share the same virtual buffer.

A sample screen is shown on the display 20 of FIG. 1. The video-control unit 28 provides a view 20a of the image captured by the remote terminal in the upper left, and a view 20b of the self-view image (showing the image in front of the local camera 22). A banner 20c at the top of the screen, just beneath the eye of the camera 22, is the teletext buffer seen by both sides of the communications channel in response to data from either the local or the remote keyboard being entered.

In a specific implementation using a VC50 unit, only one line of text is displayed, and the text scrolls from the right to the left as text that exceeds the length of the line (e.g., about 50 characters) is entered. By typing <return>, the entire line on both sides of the communications channel is cleared, and text is recalled by entering the <delete> key to scroll to the left of the text line. With more memory available, such as is provided using a VC55-type unit, more than one line of text is displayed, and text that exceeds the length of one line automatically word-wraps down to the next line. In one embodiment, text is limited to two lines to permit full viewing of the remote and/or local image view. Using the internal memory of the video-control unit, text can be recalled on a VC55-type unit by using the  and  keys to scroll up and down in the text buffer.

The pod auxiliary expansion port of the VC55-type unit can also be used to connect a printing device for outputting displayed text information. Another important aspect of the example operation of such video-teletype conferencing concerns user-friendly full-duplex teletyping, using distinguishing text display to indicate whether the text being typed has been entered by the local user or by the remote user. For example, locally-entered text can appear using a first display-screen color with a background having a second display-screen color, while remotely-entered text can appear using inverse coloring. As a more specific example, a blue display-screen color can be used for locally-entered text with a white background, and a white display-screen color can be used for remotely-entered text with a blue background. In alternative embodiments, different lines of text, different colors and/or different text fonts can be used to distinguish between users. Use of different lines and text fonts can be advantageous when using a printing device that prints in only in black.

Figure 2:
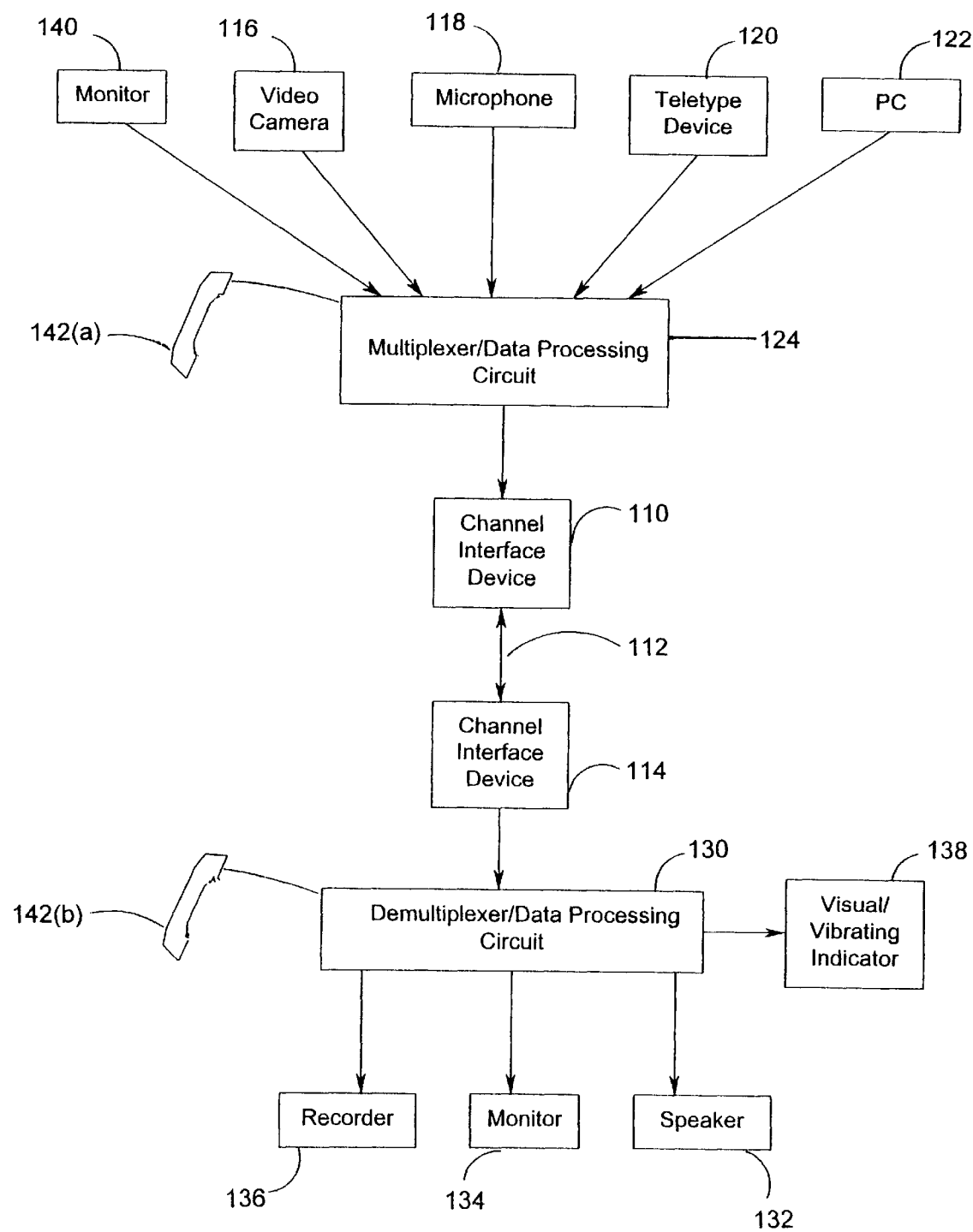
FIG. 2 is a block diagram of a video-conferencing system, according to a particular application of the present invention.

FIG. 2 illustrates a data processing system that may be implemented using the example arrangement and device types described and illustrated in connection with FIG. 1. The system of FIG. 2 includes data sending equipment depicted above a communication channel 112 of FIG. 2 and data receiving equipment depicted below the communication channel 112. While the sending and receiving of such data is often reciprocal in many data processing applications of this type as with the instant video-conferencing illustration, the configuration illustrated in FIG. 2 is simplified in this regard to facilitate the discussion.

At the sending end of the system of FIG. 2, a transmitting channel interface device 110 is used to send processed data over the communication channel 112 to a receiving channel interface device 114. The data that is presented to the channel interface device 110 is collected from various types of data sources including, for example, a video camera 116, a microphone 118, a teletype device 120, and a conventional personal computer 122. Examples of other sources, not shown in FIG. 2, from which such data can be collected include VCRs, digital still cameras, and IR keyboards. In one implementation, the video processor receives a block of data (such as a recorded movie from a VCR or a still view from a digital still camera) and annotates such input data with teletext for the hearing impaired viewer.

The data sources typically use buffers to store the data to be collected. The data collected from each of these data sources is received by multiplexer/data processing equipment (MDPE) 24. The MDPE 24 collects and formats the data collected from each of the input sources for transmission over the channel 112. A monitor 140 is optionally used with the video camera 116 to monitor the manner in which the video camera 116 captures the video images.

At the lower end of the system of FIG. 2, the formatted data communicated over the channel 112 is received by the channel interface device 114, which then presents the received data to demultiplexer/data processing equipment (DDPE) 130. The DDPE 130 is set-up to sort out the formatted data received over the channel 112 according to instructions previously sent by the MDPE 24. The demultiplexed data is then presented to the appropriate output source equipment. This equipment processes, for example, audio data to a speaker 132, video data and teletype data for display at a monitor 134 (displaying the images and the data input by the user in closed-caption format), and transmitted conferencing call and teletype data for a recorder 136 (such as a printer, VCR or magnetic recording device or other media).

Implementing the system as shown in FIG. 2 is advantageous in that the system can be programmed and configured to provide significant benefits to those using teletype equipment. According to one implementation, the MDPE 24 sends a request for a video-conferencing call, and the DMPE 130 detects the request for a video-conferencing call, and sends an output signal to activate a visual and/or vibrating indicator 138 to alert the user at the receiving end of the request. A visual indication, for example, is implemented as a built-in ring flasher. The output signal can be implemented in a number of ways. For example, the output signal can be a code in the V.8 modem standard that signals video capability. The indicator 138 can also be implemented to include audible alarms. However, for the hearing-impaired, it is important that the indicator include a visual and/or vibrating component, or other non-audible indicator.

According to another implementation, a user at the sending end of the unit sends a code over the communication channel, for example, using a specially-designated key on the teletype device 120 or via the PC 122, indicating that no audio will be sent over the channel 112. The MDPE 24 responds to this mute-type code by increasing the rate at which video data is sent over channel 112, and thereby increasing the quality of the video display at the remote end of the system. Unlike conventional equipment which detects voice inactivity and inserts a comfortable level of background noise during such silent periods, the above approach uses the audio bandwidth for transmitting video data. In more specific implementations, this video-enhanced mode of operation is established in response to the detection of a privacy mode command, precluding transmission of audio, sent over the channel. For further information regarding use of a multiplexer to increase use of the transmission channel for video data, reference may be made to U.S. patent application Ser. No. 08/815,966, filed on Mar. 13, 1997 now U.S. Pat. No. 6,026,097, filed concurrently herewith and incorporated herein by reference. For each of the embodiments or for a separate embodiment operating under a video-only default mode, the video arrangement may be configured to decrease the amount of video data transmitted over the channel in response to a command or to detecting termination of such silent periods.

Yet another implementation uses summing, separation and feedback circuitry in conjunction with, or as part of the processor-based circuit shown above in FIG. 2. In this implementation, the video communications devices shown in the system of FIG. 2 are configured to operate as a conventional telephone, using telephone handsets 142a and 142b as separate speaker/microphone sets. In this implementation, the MDPE 24 sends a request for a video-conferencing call and, if the answering device is not compatibly configured and arranged to conduct the TTY-type video-conferencing call, the MDPE 130 detects the non-compatibility and switches to a normal telephone mode of operation (or to normal video-conferencing operation). This implementation allows a teletype device user to use a video communications device, according to the present invention, with conventional telephone and teletype equipment. For further information, reference may be made to U.S. patent application Ser. No. 08/934,179, entitled Video Interface Arrangement and Method Therefor, now U.S. Pat. Np. 5,966,165 (Atty. Docket No. 11611.38US01), filed concurrently herewith and incorporated herein by reference.

It will be understood that the processor-based circuit shown above in FIG. 2 can be implemented using any of a variety of processor arrangements, including the arrangement of the referenced patent applications and that disclosed in U.S. patent application Ser. Nos. 08/692993 and 08/658917, respectively entitled and relating to issued patents also entitled "Programmable Architecture and Methods for Motion Estimation" (U.S. Pat. No. 5,594,813) and "Video Compression and Decompression Processing and Processors" (U.S. Pat. No. 5,379,351). These applications and issued patents are, incorporated herein by reference.

As another example implementation, the arrangement of FIG. 2 is configured with the features of a VC55-type ViaTV Phone arrangement and with a keypad control console, such as a keypad, coupled into the MDPE 24 using conventional wiring or an infrared transmitter/receiver arrangement, to provide the hearing-impaired user with the ability to communicate with the Internet. Using the VC55 or a similarly constructed device that does not include an integrated internal infrared receiver, an external infrared receiver for coupling the keypad can be coupled into the auxiliary expansion port, using, for example, a receiver available from Sejin Electron, Inc.

Optionally, as an alternative to establishing a communication channel for more typical hearing-impaired two-way type person to person communications, the teletype device 120 of FIG. 2 is used in conjunction with the MDPE 24 to communicate with the Internet for applications relating to the sending and receiving of e-mail and accessing the World Wide Web. In a specific embodiment, the user of the video-teletyping arrangement inputs a command (e.g., from the keyboard, phone set or TTY device) to context switch from initiating and/or receiving teletype or video-teletype phone calls to browse the internet, or to communicate (send or receive) e-mail over the internet. This is accomplished using the same types of equipment as discussed above, including the same phone line and same television.

Further, each of the above-described implementations can be configured to automatically answer incoming calls with personal greeting messages, with the ability to record messages, to provide remote message retrieval, and for adding supplemental data, including date and time-stamps, to recorded messages. In addition, the processor-based circuit can include a translation table for language support and may include a translation table for specially-assigned keys for the hearing impaired, or Deaf culture TTY abbreviations. These include but are not limited to: GA for go-ahead use to signal completion of a thought and typing segment; SK for ending a call; HOLD PLS for "hold please" for caller breaks; and SMILE for indicating levity with a transmitted message.

The MDPE 24 formats the collected data for transmission using any of a variety of modes of operation or capabilities. For example, audio data may be formatted using a capability that supports the ITU-T G.711, G.723, or G.728 standard. When using the teletype device, the MDPE 24 collects and formats data for transmission according to the H.324 video phone standard. The H.324 standard specifies a common method for video, audio, and data to be communicated simultaneously using modem connection over an analog phone line. The H.324 standard uses a normal 28,800 bps modem connection between callers. Once a modem connection has been established, the H.324 standard specifies how digital video and voice compression technologies are used to convert sounds and facial expressions into a digital signal. For example, the H.324 standard defines how these signals are compressed to fit within the data rate allowed by analog phone lines and modem connections.

Figure 3:
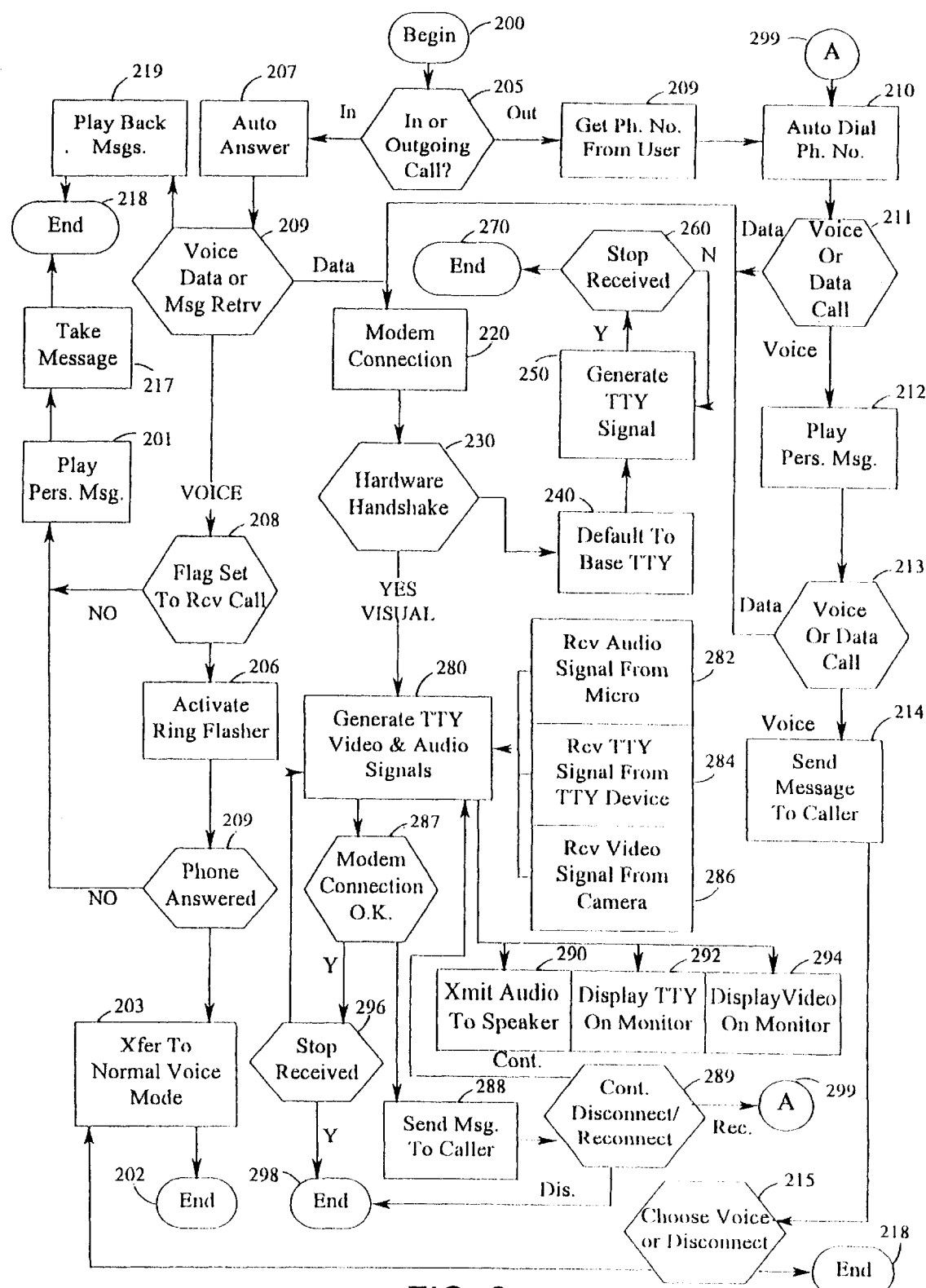
FIG. 3 is a flowchart illustrating an example method of operation of the system of FIG. 2, according to another particular application of the present invention.

FIG. 3 is a flowchart illustrating an example method of operation of the system of FIG. 2 from a general perspective. The routine is called in response to a command to initiate a connection with a second party either as an incoming phone call or as an outgoing phone call. Execution of the routine 200 begins at decision block 205. The system determines whether the call is incoming or outgoing. If the call is an incoming call, the system activates a pre-programmed subroutine to automatically answer the call 207. The auto-answer device determines whether the incoming call is a voice, data, or message retrieval call 209.

If the call is a voice call, at decision block 208 the system determines if the user has indicated that he wants to receive voice calls. If so, the system activates the ring flasher as depicted at block 206. The system will wait a pre-determined number of rings for the user to answer (block 204). If the call is answered, the system reverts to normal voice mode (block 203) and the routine ends (block 202). If the phone is not answered or if the user has not indicated he wants to receive voice calls, a personalized message is played to the caller as depicted at block 201. The system then takes a message from the caller, at block 217, and the routine ends at block 218.

The user can retrieve messages remotely through a touch-tone telephone, similar to a normal answering machine or voicemail. If, at decision block 209, the system determines that the incoming call is for message retrieval, the messages taken (block 217) are played back (block 219). This retrieval can be done in either voice or data mode. The routine then ends at block 218.

If the incoming call is a data call, a connection between modems is established using any standard modem protocol (block 220) via a channel 112 of FIG. 2. Once a connection is established, the system handshakes with the caller's system to check for visual capability with the H.324 videophone standard (block 230). If the caller does not have visual capability, the system defaults to a basic TTY mode using an ASCII character set (block 240). The MDPE 24 then generates TTY signals only (block 250). This continues until a stop command (block 260) is received which terminates the call and routine (block 270). This aspect of the invention allows the system to communicate with existing Teletype devices.

If the caller's system has visual capability, the MDPE 24 receives the data signals from the appropriate source equipment, including microphone 282, a teletype device 284 and a camera 286. The MDPE 24 then transmits the signals to the channel interface 110 using the H.324 standard. The bandwidth of an analog phone line is relatively small, so the MDPE 24 can only transmit a limited amount of data at one time. The DDPE 130 then sorts out the formatted data received according to instructions previously sent by the MDPE 24. The demultiplexed data is then presented to the appropriate output source equipment, including audio data to a speaker 290, video data to a monitor 294, and teletype information on-screen to a monitor 292. This transmission continues until a stop command 296 is executed that ends the routine 298.

At block 287, the system can be optionally configured to verify the quality of the connection between the two video-conferencing systems. If the quality of the connection falls below a predetermined level, a message is sent to the user (block 288). The user can then decide to continue the connection and simply note or record the status of the connection, disconnect and automatically reconnect, or disconnect, as shown at block 289. If the user wishes to continue the connection, the routine continues to transmit and receive at the highest quality possible. When the connection is lost, the system notifies the user and ends the routine at block 298. The user can then reconnect if he desires by returning to block 209. Returning to decision block 298, if the user decides to disconnect and end the call, the routine ends at block 298. If the user decides to disconnect and reconnect, the system transfers control at block 210 to re-establish a connection.

Returning to decision block 205, if the call is an outgoing call, the user inputs the desired phone number (block 209). The system then dials the phone number (block 210). When the caller answers, the routine determines if the transmission is voice or data (block 211). If the transmission is data, the routine transfers control to block 220 (discussed above).

If the transmission is voice, the routine plays a personalized message telling the person that the user is hearing impaired (block 212). If the caller has a hearing impaired communications device, the caller can then connect to that device. The routine will wait a predetermined amount of time for the connection. If the call is still in voice mode, a message is sent to the user stating such (block 214). The user can then choose whether to communicate in voice mode or disconnect (block 215). If the user wants to communicate in voice mode, the system transfers to normal voice mode (block 203) and the routine ends at block 202. Otherwise, the call is disconnected and the routine ends at block 216.

In a particular embodiment, the data channel format for teletype/video for the above-discussed applications is modified from the motion video convention. In this application and embodiment, teletype information is transmitted at a relatively low bit-rate (approximately 1200 bps max) with reliable transmission being a highly desirable characteristic.

Teletype information is textual in nature and consists of character text with the associated punctuation. The information is conveyed using either a pre-defined or a user-defined character set(s) or both. In this embodiment, the data channel is to be implemented as an open AL1 based data channel and supporting teletype information. Reliable transmission is provided via SRP or V.42LAPM with SRP support required and the use of V.42LAPM being optional. To indicate that the equipment at a terminal coupled to the channel has a teletype capability, an extension field of the existing H.245 Data Application Capability sequence and an SRP option is added to the Data Protocol Capability. This is illustrated in the example flow shown below:

```
DataApplicationCapability::=SEQUENCE
{
    application CHOICE
    {
        nonStandard     NonStandardParameter,
        t120            DataProtocolCapability,
        dsm-cc          DataProtocolCapability,
        userDataDataProtocolCapability,
        t84             SEQUENCE
        {
            t84Protocol     DataProtocolCapability,
            t84Profile      T84Profile
        },
        t434            DataProtocolCapability,
        h224            DataprotocolCapability,
        nlpid           SEQUENCE
        {
                        nlpidProtocol
DataProtocolCapability,
                        nlpidData       OCTET
                                        STRING
        },
                        dsvdControl     NULL,
                        h222DataPartitioning
DataProtocolCapability,
        . . .
        {
                        teleTypeProtocol
DataProtocolCapability
                        teleTypeProfile     TeleTypeProfile
        }
    },
    maxBitRate INTEGER (0..4294967295),     --units 100 bits/sec
    ...
}
DataProtocolCapability    ::=CHOICE
{
    nonStandard             NonStandardParameter,
    v14buffered             NULL,
    v421apm                 NULL, --may negotiate to
                            V.42bis
    hdlcFrameTunnelling     NULL,
    h310SeparateVCStack     NULL,
    h310SingleVCStack       NULL,
    transparent             NULL,
    . . .
    SimpleRetransmissionProtocol    NULL
}
```

Information on the opened data channel consists of OCTETS indexing a font codebook. One octet (0x0) is reserved and used to indicate out of band information. Out of band information consists of two possibilities, font changes and new character definitions for the current font.

Font switches are indicated by a two OCTET pair. The first octet (0x1) indicates a font switch. The next octet indicates which font to switch to.

New character definitions for the current font are indicated by the OCTET 0x2. A varying number of octets after this one is used to specify the new character. The immediately following octet indicates which character in the current font should be defined/redefined. 0x0 is not allowed as a character index. The next two octets indicate the dimension of the character definition in x and y pixels. The next octet indicates the relative display size of y dimension pixels to x dimension pixels given in the format nnn.mmmmm base 2. The next octet indicates the number of y dimension pixels in the character ascender. The following octet indicts the relative height (ascender) of the defined character to the default character size again specified in the format nnn.mmmmm base 2. The default size is implementation-dependent. Enough octets then follow to specify the bitmap of the defined character given in row major format with no inter-row gaps. Enough padding spaces are added at the end of the definition to align the definition to OCTET boundaries.

The ability to specify new characters in a font and switch fonts dynamically during communication allows for a total of 256*255=65280 characters. The support for more than one font and defining/redefining font characters is optional in the proposed teletype support. In order to simplify implementation, font '0' is defined corresponding to the ASCII character set with characters 128 to 255 and 0 being not defined. The height of font '0' exclusive of character redefinition's will be the default character size in the system. The ability to support multiple fonts and defining new font characters is specified in the TeleTypeProfile of the H.245 syntax as shown below:

```
TeleTypeProfile::--SEQUENCE
{
    numberOfFonts       INTEGER(1..256)
    advancedFontSupport BOOLEAN
}
```

If the numberOfonts supported is greater than 1, advancedFontSupport must be true. If the numberOfFonts supported is equal to 1, advancedFontSupport can be true or false.

In yet another application, the above video-teletyping equipment is configured and programmed to visually narrate, using text sent along with the video over the communications channel, a segment of video input to the video-control unit from one of its various audio/video input ports. For example, this segment of video might include a home or commercial movie from a prerecorded medium (e.g., VCR or DVD), digital still pictures, and pictures from a family album.

Another aspect of the present invention involves connecting a conventional TTY type device directly into a videophone. In this video-teletype communication arrangement, a TTY device, including user-engageable keys, generates teletype data in response to a user engaging the keys; and a processor-based circuit has a program that, when executed, causes the processor-based circuit to communicate the video image data and the teletype data over a communications channel. This arrangement can be advantageous in that the tones generated by the TTY device can be transmitted as part of the lossy or lossless audio channels of the videophone (e.g., operating at an ample 5.1 or 6.1 kbits per second). Also, this enables a consistent interface when answering or initiating incoming or outgoing calls, thereby solving the interoperability problems of communicating with the installed base of text-only TTY devices without having to deal with modem negotiation sessions. Further, this allows an added dimension of information to emergency (such as "fire" or "911") lines in cases where the local TTY user is either unable or too slow to communicate a message to emergency personnel. In the case of a fire in the house, or a person suffering from a heart attack, an elderly or disabled person may be unable to communicate a message fast enough (or communicate at all) via the text-only TTY. This aspect of the present invention allow a video session to be initiated (with or without TTY text added) by either side of the communications channel.

For further details concerning aspects of the example video-control units and video-processing circuits, as well as operational and control features of the above-described videoconferencing, reference may be made to U.S. patent application Ser. No. 09/005,053, filed on Jan. 9, 1998, which is incorporated herein by reference.

The various embodiments described above are provided by way of illustration only and are not intended to limit the invention. Those skilled in the art will readily recognize various modifications and changes that may be made to the present invention without strictly following the example embodiments and applications illustrated and described herein. The scope of the present invention is set forth in the following claims.

What is claimed is:

1. A teletype communicator for communicating with a remote communication terminal over a communications channel, comprising:

a user-input device constructed and arranged to generate teletype data in response to a user; and a teletype arrangement including a receiver constructed to receive the teletype data, an interface circuit for communicating over the communications channel using a selected one of a plurality of transmission rates, and a processor-based circuit having a program that, when executed, causes the processor-based circuit to communicate teletype information over the communications channel, to generate compressed video data using a first compression rate for user display, and, after establishing communication with the remote communication terminal, to negotiate a non-audible communication mode with the remote communication terminal by using another one of the plurality of transmission rates to send video data compressed at the first compression rate.

2. A teletype communicator, according to claim 1, further including a camera arranged to capture local images and, in response, to generate a set of compressed video signals representing the captured images, and wherein the processor-based circuit is configured and arranged to: communicate video information over the communications channel; to negotiate a non-audible communication mode with the remote communication terminal by increasing the transmission rate at which the video signals compressed at the first compression rate are being generated over the communications channel to the remote communication terminal; and to generate both text data and video data for user display.

3. A teletype communicator, according to claim 2, further including a display having top support area and wherein the camera is configured in a housing that is arranged to capture local images while supported on the support area and wherein the processor-based circuit is further configured and arranged to cause the text data to be displayed above the video data, thereby directing a user that is reading the text data toward the camera.

4. A teletype communicator, according to claim 1, further including a wireless channel defined by an infrared communication protocol.

5. A video communications device, according to claim 1, wherein teletype arrangement does not include a video camera and wherein the teletype arrangement is further adapted to operate in another mode in which video data is not generated for user display.

6. A video communications device, according to claim 1, wherein teletype arrangement is configured and arranged to transmit audio on the communications channel along with video information by sending compressed video in packets; and wherein the data communicated to negotiate a non-audible communication mode with the remote communication terminal is a prerecorded audio message sent responsive to the teletype arrangement detecting audio being generated over the communications channel by the remote communication terminal and sent to indicate that the user of the teletype arrangement is communicatively disadvantaged.

7. A teletype communicator, according to claim 1, wherein the processor-based circuit is configured and arranged to negotiate a non-audible communication mode with the remote communication terminal by increasing a rate at which the compressed video signals are being generated over the communications channel to the remote communication terminal.

8. A teletype communicator, according to claim 1, wherein the data communicated to negotiate a non-audible communication mode with the remote communication terminal is a prerecorded audio message responsive to the teletype arrangement detecting audio being generated over the communications channel by the remote communication terminal.

9. A teletype communicator, according to claim 8, wherein the prerecorded audio message indicates that the teletype communicator is ready for non-audio communication.

10. A teletype communicator, according to claim 8, wherein the processor-based circuit is configured and arranged to negotiate a non-audible communication mode with the remote communication terminal by increasing a rate at which the compressed video signals are being generated over the communications channel to the remote communication terminal.

11. A method of teletype communicating with a remote communication terminal over a communications channel, comprising:

capturing images of a user, including at least one of the user's mouth and hands;

generating teletype information, including text and data representing the captured images, over a wireless channel; and receiving the teletype information over the wireless channel using a wireless receiver and, after establishing communication with the remote communication terminal, communicating the information over the communications channel for simultaneous display of the text and captured images, generating compressed video information using a first compression rate, and negotiating a non-audible communication mode with the remote communication terminal by altering a transmission rate for the video that is compressed using the first compression rate.

12. A teletype communicator for communicating with a remote communication terminal over a communications channel, comprising:

user-engageable means for generating data over a wireless channel in response to a user engaging said means; and video-teletyping means, responsive to said user-engageable means and to establishing communication with the remote communication terminal, for video-teletyping, including generating compressed video information using a first compression rate, and for negotiating a non-audible communication mode with the remote communication terminal by altering a transmission rate for the video that is compressed using the first compression rate.

13. A teletype communicator for communicating with a remote communication terminal over a communications channel, according to claim 12, wherein said means for video-teletyping includes receiver constructed to receive the data over the wireless channel, an interface circuit for communicating over the communications channel, and a processor-based circuit having a program that, when executed, causes the processor-based circuit to communicate video and text data over the communications channel and to generate at least the text data for user display.

14. A teletype communication arrangement for use with a television set, comprising:

a TTY device including user-engageable keys arranged to generate data in response to a user engaging the TTY device;

a processor-based circuit having a program that, when executed, causes the processor-based circuit to communicate teletype information over a communications channel, the processor-based circuit being adapted to generate compressed video information using a first compression rate and control information that, after establishing communication with the remote communication terminal, negotiates a non-audible communication mode with a remote communication terminal, in which video information compressed using the first compression rate is transmitted at a different transmission rate; and an interface circuit configured to respond to the processor-based circuit by generating data, including at least text information, for display on the television set.

15. A teletype communication arrangement for use with a television set, according to claim 14, wherein the control information that negotiates a non-audible communication mode with a remote communication terminal includes a prerecorded message requesting a non-audio mode.

16. A teletype communication arrangement for use with a television set, according to claim 10, wherein the control information that negotiates a non-audible communication mode with a remote communication terminal includes an increased a rate at which the compressed video signals are being generated over the communications channel.

17. A teletype communication arrangement for use with a television set, according to claim 14, wherein the control information that negotiates a non-audible communication mode with a remote communication terminal includes a prerecorded message requesting a non-audio mode, and an increased a rate at which the compressed video signals are being generated over the communications channel.

18. A teletype communication arrangement for use with a television set, comprising:

TTY means, including user-engageable keys, for generating teletype data in response to a user engaging said TTY means;

a processor-based circuit having a program that, when executed, causes the processor-based circuit to communicate the teletype data over a communications channel, the processor-based circuit being adapted to generate compressed video information using a first compression rate and, after establishing communication with the remote communication terminal, communicating information for negotiating a non-audible communication mode with a remote communication terminal, in which video information compressed using the first compression rate is transmitted at a different transmission rate; and means for responding to the processor-based circuit by generating data, including at least text information, for display on the television set.

19. A video-teletype communicator use with a display screen as part of at least one of a plurality of communication terminals communicating over a communications channel, comprising:

an interface circuit for communicating user-input information over the communications channel; and a processor-based circuit responsive to the interface circuit and having a program that, when executed, causes the processor-based circuit to communicate teletype information over the communications channel and to generate data for user display, the generated data being formatted for the display screen with a teletext banner and a remote view image along a top portion of the display screen, and the processor-based circuit being adapted to generate compressed video information using a first compression rate and, after establishing communication with the remote communication termina, communicating information for negotiating a non-audible communication mode with a remote communication terminal, in which video information compressed using the first compression rate is transmitted at a different transmission rate.

20. A video-teletype communicator, according to claim 19, wherein the teletext banner includes at least one of: text display that distinguishes between text generated from a first one of the plurality of terminals and text generated from a second one of the plurality of terminals; text that is recalled from a memory buffer; text display that scrolls in response to user-input data; and text display that rolls over to a second line.

21. A video-teletype communicator, according to claim 19, wherein the generated data for the display screen includes the teletext banner along a top portion of the display screen, a remote view image under and near the teletext banner, and a local view image, the local view image being displayed in a smaller area of the display screen than the remote view image.

22. A video-teletype communicator, according to claim 19, further including a camera arranged adjacent the top of the display screen wherein the teletext banner and the remote view image are arranged to permit a user to view the teletext banner and the remote view image while giving the appearance of a user looking at the camera.

23. A method of video-teletype communicating involving a display screen as part of at least one of a plurality of communication terminals communicating over a communications channel, comprising:

communicating user-input information over the communications channel; and processing the user-input information for communicating teletype information over the communications channel and generating data for user display, and formatting the generated data for a display screen with a teletext banner and a remote view image along a top portion of the display screen, the processing including generating compressed video information using a first compression rate and, after establishing communication with the remote communication terminal, communicating information for negotiating a non-audible communication mode with a remote communication terminal, in which video information compressed using the first compression rate is transmitted at a different transmission rate.

24. A method of video-teletype communicating, according to claim 23, wherein the teletext banner includes at least one of: text display that distinguishes between text generated from a first one of the plurality of terminals and text generated from a second one of the plurality of terminals; text display that scrolls in response to user-input data; and text display that rolls over to a second line.

25. A method of video-teletype communicating, according to claim 23, wherein the generated data for the display screen includes the teletext banner along a top portion of the display screen, a remote view image under and near the teletext banner, and a local view image, the local view image being displayed in a smaller area of the display screen than the remote view image.

26. A method of video-teletype communicating, according to claim 23, wherein the teletext banner and the remote view image are arranged to permit a user to view the teletext banner and the remote view image while giving the appearance of a user looking at a camera arranged adjacent and above the display screen.

27. A video-teletype communicator involving a display screen as part of at least one of a plurality of communication terminals communicating over a communications channel, comprising:
    means for communicating user-input information over the communications channel;
    means for processing the user-input information for communicating teletype information over the communications channel and generating data for user display, and for generating compressed video information using a first compression rate and, after establishing a communication connection, communicating information for negotiating a non-audible communication mode with a remote communication terminal by altering a transmission rate for the video that is compressed using the first compression rate; and
    means for formatting the generated data for a display screen with a teletext banner and a remote view image along a top portion of the display screen.

28. A video-teletype communication arrangement, comprising:
    a TTY device, including user-engageable keys, for generating teletype data in response to a user engaging the keys; and
    a processor-based circuit having a program that, when executed, causes the processor-based circuit to communicate video image data and the teletype data over a communications channel, and the processor-based circuit being adapted to generate compressed video information and information for negotiating a non-audible communication mode with a remote communication terminal by altering a transmission rate for the video that is compressed and without altering a rate of video-information compression.

29. A video-teletype communication arrangement, comprising:
    an input device for generating teletype data corresponding to portions of at least one video image; and
    a processor-based circuit having a program that, when executed, causes the processor-based circuit to communicate said at least one video image data and the teletype data over a communications channel for a display including the text reproduced for reading along with the video image data for viewing, and the processor-based circuit being adapted to generate compressed video information and information for negotiating a non-audible communication mode with a remote communication terminal by altering a transmission rate for the video that is compressed and without altering a rate of video-information compression.

30. A video-teletype communication arrangement for communicating over a communications channel, comprising:
    means, including user-engageable keys, for generating teletype data in response to a user engaging the keys; and
    a processor-based circuit having a program that, when executed, responds to a command received from the means for generating by switching between communication modes, the communication modes including at least following: communicating video image data and the teletype data over the communications channel for display by using one of a plurality of transmisson rates for sending video and without altering a rate of video compression; and accesing the internet using the communications channel.

31. A video-teletype communication arrangement for communicating over a communications channel, according to claim 30, wherein the processor-based circuit is adapted to generate compressed video information and to negotiate a non-audible communication mode with a remote communication terminal.

32. A video-teletype communication arrangement for communicating over a communications channel, according to claim 31, wherein the processor-based circuit is adapted to negotiate a non-audible communication mode with a remote communication terminal by increasing a rate at which the compressed video signals are being generated.

33. A video-teletype communication arrangement for communicating over a communications channel, according to claim 31, wherein the processor-based circuit is adapted to negotiate a non-audible communication mode with a remote communication terminal by sending a prerecorded audio message over the communications channel indicating that the processor-based circuit is ready for non-audio communication.

34. A video-teletype communication arrangement for communicating over a communications channel, according to claim 31, wherein the processor-based circuit is adapted to negotiate a non-audible communication mode with a remote communication terminal by sending a prerecorded audio message over the communications channel indicating that the processor-based circuit is ready for non-audio communication and by increasing a rate at which the compressed video signals are being generated.

* * * * *